United States Patent [19]

Timm

[11] Patent Number: 4,744,943
[45] Date of Patent: May 17, 1988

[54] PROCESS FOR THE DENSIFICATION OF MATERIAL PREFORMS

[75] Inventor: Edward E. Timm, Traverse City, Mich.

[73] Assignee: The Dow Chemical Company, Midland, Mich.

[21] Appl. No.: 939,340

[22] Filed: Dec. 8, 1986

[51] Int. Cl.⁴ .............................................. B22F 1/00
[52] U.S. Cl. ......................................... 419/10; 419/49;
419/56; 264/56; 264/57; 264/64; 264/65;
264/125; 264/570; 264/332
[58] Field of Search ............... 419/10, 49, 56; 264/56,
264/57, 64, 65, 125, 570, 332

[56] References Cited

U.S. PATENT DOCUMENTS

| Re. 28,301 | 1/1975 | Havel | 75/223 |
|---|---|---|---|
| Re. 32,117 | 4/1986 | Weaver | 419/42 |
| 3,356,496 | 12/1967 | Hailey | 75/226 |
| 3,363,037 | 1/1968 | Levey, Jr. et al. | 264/125 |
| 3,455,682 | 7/1969 | Barbaras | 25/204 |
| 3,469,976 | 9/1969 | Iler | 75/204 |
| 3,577,635 | 5/1971 | Bergman et al. | 419/42 |
| 3,622,313 | 11/1971 | Havel | 75/226 |
| 3,689,259 | 9/1972 | Hailey | 175/226 |
| 3,700,435 | 10/1972 | Chandhok | 75/214 |
| 3,992,200 | 11/1976 | Chandhok | 75/211 |
| 4,041,123 | 8/1977 | Lange et al. | 264/332 |
| 4,081,272 | 3/1978 | Adlerborn | 75/223 |
| 4,081,505 | 3/1978 | Kawai | 264/313 |
| 4,094,053 | 6/1978 | Weaver | 419/42 |
| 4,112,143 | 9/1978 | Adlerborn et al. | 427/191 |
| 4,341,557 | 7/1982 | Lizenby | 75/223 |
| 4,368,074 | 1/1983 | Otto, Jr. et al. | 419/51 |
| 4,381,931 | 5/1983 | Hunold et al. | 65/18.1 |
| 4,389,362 | 6/1983 | Larsson | 264/111 |
| 4,428,906 | 1/1984 | Rozmus | 419/48 |
| 4,446,100 | 5/1984 | Adlerborn et al. | 419/48 |
| 4,478,626 | 10/1984 | Moritoki et al. | 65/18.1 |
| 4,499,048 | 2/1985 | Hanejko | 419/49 |
| 4,554,117 | 11/1985 | Ezis et al. | 264/67 |
| 4,601,873 | 7/1986 | Fujii et al. | 419/49 |
| 4,656,002 | 4/1987 | Lizenby et al. | 419/49 |

OTHER PUBLICATIONS

*Metals Handbook*, vol. 7, pp. 542–546, "Rapid Omnidirectional Compaction", Clifford A. Kelto.

Primary Examiner—Stephen J. Lechert, Jr.
Attorney, Agent, or Firm—Paul D. Hayhurst

[57] ABSTRACT

A process for preparing dense, consolidated bodies, the process comprising compressing in a forging press an isostatic die assembly, the assembly comprising a preform surrounded by a fluid pressure-transmitting medium, the medium and the preform being contained in a shell having an open top; under sufficient conditions of temperature, time and pressure that a dense, consolidated body of desired shape is formed, and then recovering the body by separating the body from the fluid pressure-transmitting medium.

20 Claims, 3 Drawing Sheets

PROCESS FOR THE DENSIFICATION OF MATERIAL PREFORMS

BACKGROUND OF THE INVENTION

The present invention relates to consolidation of metallic and nonmetallic powders and combinations thereof to form a consolidated body of predetermined density.

Consolidated, or high density as a percent of theoretical density, ceramic-containing bodies are useful in the cutting, drilling and shaping of hard materials, such as rock and superalloys. Additionally, these bodies possess superior hardness, strength and wear resistance and are useful in numerous applications where such properties are desirable.

Several methods are known for consolidating powders. Typically, these methods involve the formation of a preform by cold pressing the powder to be consolidated, or, alternatively, the powder to be consolidated is used to fill a can which is then sealed hermetically. Consolidation often requires pressure which is typically provided by either mechanical means, e.g., a forging press, or gaseous means, e.g., the preform is subjected to a gas at superatmospheric pressure.

Each method has problems which are unique to it. For example, U.S. Pat. No. 4,446,100 teaches a process for the consolidation of preforms using inert gas pressure. In this process, a preform is placed into a vessel which is open at the top, the preform then being embedded in glass powder. The vessel consists of graphite and is internally provided with a release layer of boron nitride. One or more vessels are placed in a high pressure furnace, wherein the preforms are consolidated. Said patent teaches that it is essential that the molten glass-containing vessel is subjected to pressure by a gaseous pressure medium and not by a piston in a mold cavity, as the glass would tend to penetrate out between the piston and the mold cavity when subjected to pressure.

A piston can be used as the pressure source when using a vessel with a closed top. For example, U.S. Pat. No. 4,428,906 teaches the consolidation of powder either as a preform or as a powder disposed within a sealed container. The material to be consolidated is encapsulated in a special monolithic pressure-transmitting medium which in turn is placed within a pot die of a press, and consolidation is performed using the ram of the press. The pressure-transmitting medium is a mixture of a fluidizing material, e.g., glass, and a rigid interconnected ceramic skeleton structure which is collapsible in response to a predetermined force. The glass is supported by and retained within the skeleton structure. As external pressure is applied by the ram, the ceramic skeleton structure collapses to produce a composite of ceramic skeleton structure fragments dispersed in a fluidizing glass. In this process, a preform is prepared for consolidation by casting around the preform a solid vessel of the composite pressure-transmitting medium. Said patent teaches that glass from the pressure-transmitting medium fills the gap between the ram and the pot die and is cooled by the metal of the ram and die, which has a high coefficient of heat transfer. The cooled glass forms a seal which prevents the glass from extruding through the gap between the ram and the pot die, and thus allows the ram to pressurize the contents of the vessel. However, this method does not use a vessel with an open top, and the one-piece vessel comprising the cast composite pressure-transmitting medium surrounding the now consolidated part must literally be hammered to fragments to recover the product. Hammering is a timehonored method of recovering consolidated bodies. See, for example, U.S. Pat. No. 3,469,976; U.S. Pat. No. 4,428,906; and U.S. Pat. No. 3,455,682. Unfortunately, the forces employed in breaking the solid medium frequently damage brittle, consolidated bodies, such as, for example, ceramic bodies, which tend to crack along with the solidified encapsulating material. Thus, the method of U.S. Pat. No. 4,428,906 solves the problem of glass extrusion but raises the problem of how to recover brittle products.

One solution to the recovery problem is to simply remove glass or other pressure-transmitting media while still molten. See U.S. Pat. No. 4,478,626. Said patent teaches the use of vessels with open tops and the use of gas pressure, and is thus similar to U.S. Pat. No. 4,446,100. However, this method is not suitable for use with a one-piece vessel, e.g., a single encapsulating mass as taught in U.S. Pat. No. 4,428,906, which is one encapsulating mass and which must be solidified to be recovered.

In summary, the prior art requires the use of sealed, deformable containers when using piston-induced pressure. The methods of the prior art can use vessels with open tops when pressure is supplied by a pressurized gas. Consolidation using pressurized gas as the pressure source is disadvantageous in that it requires long cycle times, is expensive in that it is capital intensive, and is somewhat hazardous due to the fact that it employs large amounts of energy stored as compressed gas. The use of sealed containers is disadvantageous due to the fact that a sealed container must be opened, adding additional process steps, and often leading to damage of the consolidated product. Accordingly, it would be desirable to have a process which would not require gaseous pressure, which would not require sealed containers to enclose the molten pressure-transmitting medium, and which would allow easy recovery of brittle, consolidated bodies free of structural damage.

SUMMARY OF THE INVENTION

The present invention is such a method for the preparation of consolidated bodies, the process comprising compressing in a forging press an isostatic die assembly, the assembly comprising a preform surrounded by a fluid pressure-transmitting medium, the medium and the preform being contained in a shell having an open top; under sufficient conditions of temperature, time and pressure that a dense, consolidated body of desired shape is formed, and then recovering the body by separating the body from the fluid pressure-transmitting medium. Advantageously, this process has improved efficiency, as fewer parts are broken in the recovery process. The process is a further improvement in that it can be more energy efficient, as the medium can be removed from the body while warm and flowable. Thus, the medium can be recycled as a fluid, thereby retaining much of its energy. The consolidated body can be cooled separately. Surprisingly, the use of an open-topped vessel, thus exposing hot molten glass to the relatively cold (300°–400° F.) steel face of the ram without insulation at high pressure, does not lead to deterioration of the ram due to thermal shock or chemical attack.

DETAILED DESCRIPTION OF THE INVENTION

The process of the present invention is an improved process for consolidating powders. All materials capable of being consolidated, or densified, can be employed, and several are known to those skilled in the art. For example, the powder to be consolidated can be metal, nonmetal, or mixtures thereof; specific examples of powders include metal, ceramic, or polymer powders, or mixtures thereof, e.g., a cermet. The powder to be consolidated can be pure, substantially pure, or can include other materials, such as stabilizers or constituent elements, such as carbon in the case of a refractory carbide. The process of the present invention is especially adapted for use with materials which lead to consolidated bodies that are brittle at the desired, predetermined density. For the purposes of the present invention, "brittle" refers to materials wherein the mathematical difference between the yield strength and the ultimate strength is less than 0.2 percent of the elongation for the material. Ceramic-containing powders are preferred. The ceramic-containing powder can be purely ceramic, i.e., an inorganic, nonmetallic material, or can be a material including ceramic and metallic or other materials.

The ceramic material employed in the process of the present invention typically is a particulate refractory material. In general, any ceramic material which has refractory characteristics is useful in this invention. Refractory ceramic materials include mixed crystals such as sialons. Examples of typical refractory ceramic materials include refractory oxides, refractory carbides, refractory nitrides, refractory phosphides, refractory silicides, refractory borides, refractory sulfides and mixtures thereof. Examples of preferred refractory ceramic materials include refractory alumina, zirconia, magnesia, mullite, zircon, thoria, beryllia, urania, spinels, tungsten carbide, tantalum carbide, titanium carbide, niobium carbide, zirconium carbide, boron carbide, hafnium carbide, silicon carbide, niobium boron carbide, aluminum nitride, titanium nitride, zirconium nitride, tantalum nitride, hafnium nitride, niobium nitride, boron nitride, silicon nitride, titanium boride, chromium boride, zirconium boride, tantalum boride, molybdenum boride, tungsten boride, cerium sulfide, molybdenum sulfide, cadmium sulfide, zinc sulfide, titanium sulfide, magnesium sulfide, zirconium sulfide and mixtures thereof. More preferred ceramic materials include $ZrO_2$, $Al_2O_3$, $Si_3N_4$, SiC, mullite, cordierite, spinel, ZnO, $BaTiO_3$, TiC and mixtures thereof. An example of a more preferred ceramic material is zirconia, which can be pure or can include other materials such as stabilizers, e.g., $Y_2O_3$, $CeO_2$, MgO, CaO and mixtures thereof. Ceramic materials include ceramic composites such as a composite of silicon carbide whiskers and alumina.

Metallic materials which can be employed alone or with the ceramic material in this invention include metals, metalloids, alloys and mixtures thereof. Examples of typical metallic materials include cobalt, nickel, iron, tungsten, rhenium, steel, stainless steel, superalloys, molybdenum, tantalum, titanium, chromium, niobium, boron, zirconium, vanadium, palladium, hafnium, aluminum, copper, alloys thereof and mixtures thereof. Preferred metallic materials include cobalt, nickel, titanium, chromium, niobium, boron, palladium, hafnium, tantalum, molybdenum, zirconium, vanadium, aluminum, copper, alloys thereof and mixtures thereof. Examples of additional preferred materials which can be employed include magnesium, $Ti_3Al$, $Ni_3Al$, silicon, beryllium, germanium and mixtures and alloys of these. More preferred metallic materials include cobalt, chromium, nickel, titanium, niobium, palladium, hafnium, tantalum, aluminum, copper and mixtures thereof. Still more preferred metallic materials include cobalt, niobium, titanium and mixtures thereof. The most preferred metallic materials include molybdenum, tungsten, tantalum, rhenium, niobium, vanadium, chromium, cobalt and mixtures and alloys of these with each other and other elements and compounds.

When employed with a ceramic material, the metallic material typically is from about zero to about 90 volume percent of the ceramic/metal mixture. Preferably, the metallic material is from about 0.5 to about 85 volume percent of the mixture. Most preferably the material to be consolidated or densified is entirely ceramic.

Examples of preferred polymeric materials include polyethylene, polytetrafluoroethylene and mixtures of these with other polymers or each other.

The densification, or consolidation, process can be any known process which employs the application of mechanically induced pressure to a pressure-transmitting medium, such as glass, which is liquid at consolidation conditions to omnidirectionally consolidate materials. The use of mechanically induced pressure, versus gaseous pressure, is well known in the art. See, e.g., U.S. Pat. Nos. 4,428,906 and 4,389,362. Preferably, the pressure is supplied by a forging press.

A distinguishing characteristic of the present invention is the improved method for recovering consolidated parts. For example, the recovery steps of the forging prior art literally hammered brittle solidified materials to recover the parts embedded therein. However, hammering often damaged brittle parts making them unusable. The recovery step of the present invention involves draining the liquid pressure-transmitting medium away from the consolidated part, thereby eliminating the need for hammering. Glass is a typical pressure-transmitting medium. See, e.g., U.S. Pat. Nos. 3,469,976 and 4,446,100. While, technically speaking, glass is always in a flowable state, for practical purposes it is a solid at room temperature. Thus, the draining of glass away from the consolidated part typically occurs at an elevated temperature at which the pressure-transmitting medium is a flowable fluid.

The fluid medium can be drained by a variety of methods. For example, the medium can be drained by punching a hole in the shell containing the medium and the consolidated part, thereby allowing the medium to flow out the hole by gravity. The draining can be accelerated by using differential pressure or force. In a preferred embodiment, a shell which is open at the top can be inverted over a filter means, such as a screen. The filter is of such a size that the fluid pressure-transmitting medium passes through the filter while the consolidated body is retained on the filter; see, for example, FIG. 4.

The filter can be any filtering means which can substantially separate the fluid pressure-transmitting medium from the consolidated body of bodies. Examples of filters include gratings, screens, gridwork and the like. Preferably, the filter is a screen. The screen can be constructed of any material which will allow the screen to perform its function. Examples of suitable materials of construction for the filter or screen include type 304 stainless steel, RA-330 (available from Rolled Alloys, Detroit, Mich.), refractory metals, e.g., W, Ta, Mo, alloys thereof, etc., and zirconia, alumina, quartz, graphite, and typical refractory ceramic compositions, such as firebrick.

It is possible to solidify the recovered fluid medium, grind it, and recycle the ground medium, e.g., ground glass. In another preferred embodiment of the invention, the fluid medium is recycled as a fluid, e.g., it is introduced into a shell with a preform in preparation for densification of the preform. This "fluid recycle" is advantageous as the energy put into the medium substantially is retained.

The pressure-transmitting medium in which the preform is embedded can be any material or mixture of materials which is a liquid or fluid at the consolidation conditions. Several of these are known in the art. Typical media include glass and certain salts, with glasses being preferred. Boron-containing glass is more preferred. The teachings of U.S. Pat. Nos. 4,446,100; 3,469,976; and 3,455,682 regarding glasses, salts, and other pressure-transmitting media in which preforms can be embedded and which are flowable at consolidation conditions are incorporated herein by reference. Pyrex No. 7740 brand glass is most preferred. This glass may be chemically treated as taught in U.S. Pat. No. 3,469,976.

Any combination of pressure, temperature and time under which the desired consolidation takes place can be employed. The particular pressure, temperature and time required to achieve the desired results are dependent upon the particular material employed. Those skilled in the art can choose the particular pressures, temperatures and times based upon well-known criteria.

Typically, the temperature employed in the consolidation is from about 400° C. to about 2,900° C. Typically, the pressure is from about 10,000 to about $5 \times 10^5$ psi (68.9 to $3.45 \times 10^3$ MPa) and is such that a permanent reduction of the volume, i.e., a densification, of the preform occurs. Preferably, the pressure is supplied in an isostatic manner. One preferred method of transmitting isostatic pressure to a material to be bound and densified is described in U.S. Pat. No. 4,428,906 (relevant portions are incorporated herein by reference). It is most preferred to employ a hydraulic press to achieve the desired pressure. Preferably, the pressure is between about 10,000 psi (68.9 MPa) and the fracture point of the body. More preferably, the pressure is between about 50,000 psi ($3.45 \times 10^2$ MPa) and the fracture point of the body; still more preferably between about 70,000 psi ($4.82 \times 10^2$ MPa) and said fracture point; and most preferably between about 100,000 psi ($6.89 \times 10^2$ MPa) and said fracture point. The maximum pressure applied is preferably less than about 500,000 psi ($3.45 \times 10^3$ MPa). The pressure must be sufficient to densify a cold compact of the powder to at least 85 percent density in less than 1 hour, preferably at a temperature below the liquidus temperature of the material to be compacted. Preferably, the pressure is sufficient to accomplish the above-described densification in less than 30 minutes, more preferably in less than one minute, and even more preferably in less than 10 seconds. A rate of pressure increase greater than about 1,000 psi/sec (6.89 MPa/sec) is preferred and a rate of pressure increase greater than 10,000 psi/sec (68.9 MPa/sec) is more preferred. It is believed that if the pressure used is too high, the refractory bodies prepared may fracture and if the pressure used is too low, the refractory bodies prepared have a density too low for desired end uses.

The time used is that which is sufficient to densify the refractory body to the desired, predetermined density. The refractory body is exposed to the desired pressure for a time which is between that time sufficient for the ceramic composite to reach at least about 85 percent of its theoretical density and that time sufficient for the material densified to undergo sintering at the same temperature. It has been discovered that times of between about 0.01 second and about 1 hour are generally suitable for achievement of the desired densification. The more preferred time for achievement of the desired densification is less than about 30 minutes; even more preferred is less than about 10 minutes; still more preferred is less than about 1 minute; and the most preferred is less than about 20 seconds.

It should be recognized that there are practical considerations which will dominate the selection of the proper time, temperature and pressure variables according to this invention. Generally, the pressing pressure is limited by the design of the press tooling and is chosen to be as high as is possible without damaging this tooling. The pressing time is limited by heat transfer to the press tooling from the hot isostatic die assembly and is chosen to be as long as is possible without overheating the tooling. Consequently, the pressing temperature is minimized consistent with the requirement of achieving the desired density in the consolidated part. Excessively high temperatures can cause excessive grain growth in the ceramic material with a deleterious effect on mechanical properties of the product. It will be evident to those skilled in the art that grain growth inhibitors can be used to extend the range of practice of this invention.

The high density refractory bodies of this invention generally have a density of about 85 percent of theoretical density or greater, preferably about 90 percent or greater and more preferably about 95 percent or greater and most preferably about 100 percent. High density refers herein to a density of about 90 percent or greater of theoretical.

Figure 1:
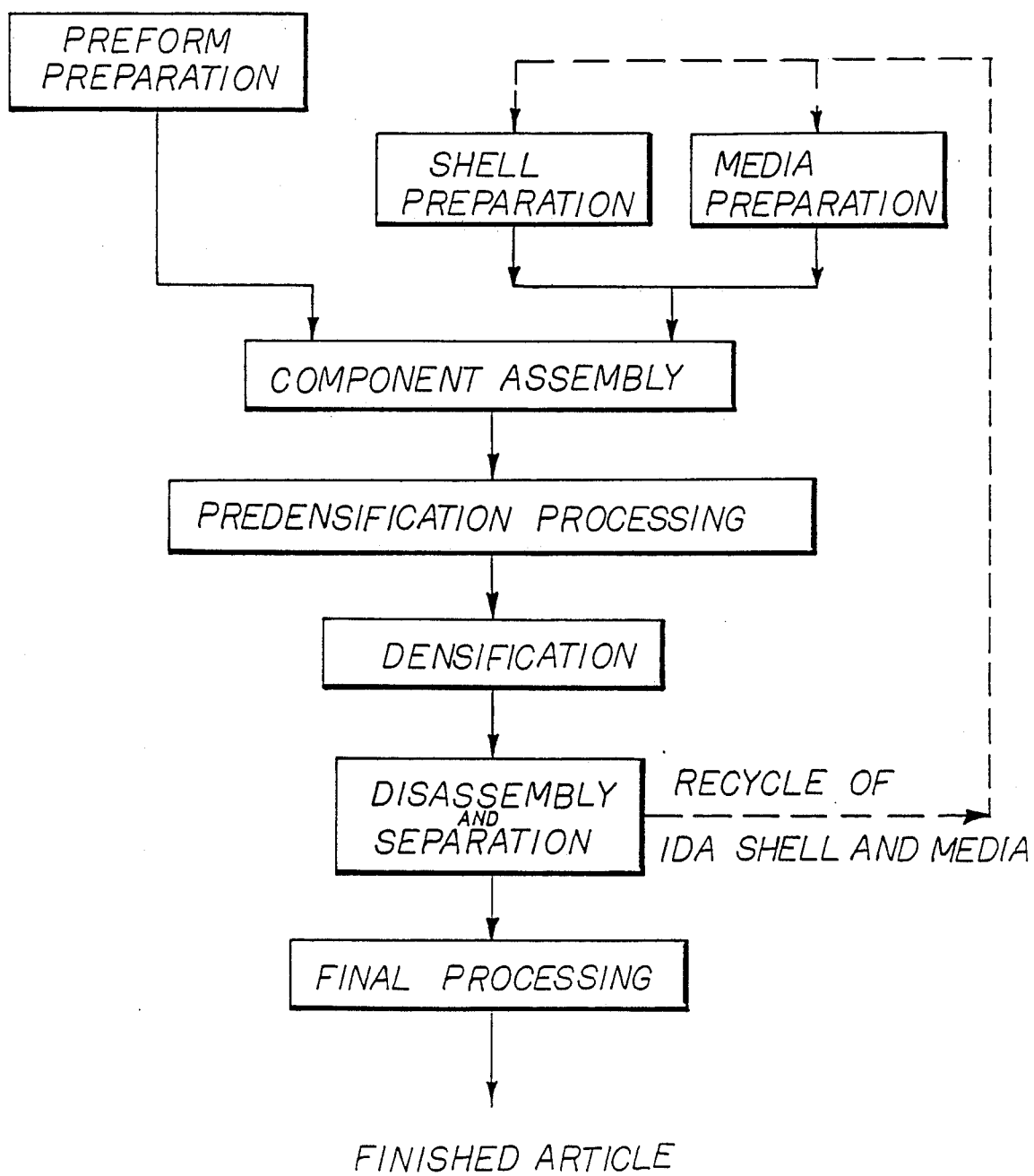
FIG. 1 is a process block diagram of an embodiment of the present invention.

The items depicted by numbers in the drawings are as follows:

| FIG. | Item No. | Description |
|---|---|---|
| 2 | 10 | Shell. |
| 2 | 11 | Aperture for inserting and removing preforms, media, etc. |
| 2 | 12 | Fixture(s) (optional). |
| 2 | 13 | Preform; article to be consolidated. |
| 4 | 13′ | Consolidated article. |
| 2 | 14 | Molten glass; pressure-transmitting media. |
| 2,3 | 15 | Assembled IDA (isostatic die assembly) at elevated temperature. |
| 3 | 15′ | Inverted open-topped IDA. |
| 3 | 16 | Clearance between the pot die (18) and the ram (17). |

-continued

| FIG. | Item No. | Description |
| --- | --- | --- |
| 3 | 17 | Hydraulic forging press ram. |
| 3 | 18 | Hydraulic forging press pot die. |
| 3 | 19 | Hydraulic foging press ejector assembly. |
| 4 | 20 | Rack to support inverted open-topped IDA (15'). |
| 4 | 21 | Screen. |
| 4 | 22 | Tray for recovery of 14. |
| 4 | 23 | Furnace. |

DESCRIPTION OF THE PREFERRED EMBODIMENTS

FIG. 1 shows a preferred process flow diagram for the present invention. Each step is described in detail in this section.

Preform Preparation

It is preferred to employ a preform. A preform is prepared using technology familiar to the powder metals or ceramics industry. The preparation of preforms is well-known. See, e.g., U.S. Pat. No. 4,446,100, the teachings of which relating to preforms are incorporated herein by reference. Typically, a particulate material, which can contain reinforcements, fillers, densification aids, binders, lubricants, dispersants, flocculents, etc., is shaped into the desired configuration using uniaxial pressing, isostatic pressing, slip casting, extrusion, injection molding or any similar technology. The resulting article is prepared for densification by thermal or chemical debindering, pre-sintering, green machining, re-isospressing, and the like. A protective coating can be applied to the consequent article to prevent reaction with the environment. In extreme cases, the article can be "canned" in an impervious container to permit handling without atmospheric contamination.

Preparation of Pressure-Transmitting Medium and Its Shell

The article to be densified is embedded in a material which acts as a viscous liquid at process temperature and which serves to isostatically densify the article when both are confined and compressed in a closed cavity with a ram. Suitable liquids and pseudo liquids are taught in the following U.S. Pat. Nos.: 4,446,100; 3,469,976; 3,455,682; and 3,700,435, the teachings of each of which are incorporated herein by reference insofar as they relate to pressure-transmitting media. Examples of typical pressure-transmitting media include, for example, metals, salts, glasses, oils, greases and mixtures of these. The preferred pressure-transmitting medium is a glass with a composition determined by the requirement that its viscosity at densification temperature is sufficiently high that the glass does not significantly penetrate the embedded article during densification. Glasses with acceptable melt viscosities range from high lead glass, useful at 600° C. to 800° C., to Corning ® type 7740, useful at 1,100° C. to 1,400° C., and beyond. Use of most ionic salts as pressure-transmitting media is less preferred due to their low melt viscosity at temperatures only slightly above their melting points. Organic greases can be used at low temperatures, as can other organic materials with suitable characteristics. Chemical inertness is an important consideration when choosing a pressure-transmitting medium. Embedded articles which are reactive with or are wet by the media may require coating or canning. Atmosphere control compounds such as carbon can be mixed with the pressure-transmitting media, and function, as is well-known, to prevent undesirable chemical reactions. Thixotropic monolithic pressure-transmitting media as taught in, e.g., U.S. Pat. No. 4,428,906 can shear and fracture delicate enclosed articles during densification.

Since the pressure-transmitting medium is a liquid or pseudo liquid at densification temperature, it and the embedded article(s) must be contained in a shell. The shell preferably has the following characteristics:

a. The shell/media/article assembly preferably is compressed in closed tooling by a ram to effect densification of the enclosed article. Preferably, a cylindrical cavity closed at one end by an ejector assembly and at the other by a cylindrical ram, known in the forging industry as pot die tooling, is used to compress the shell/media/article assembly. In this case, the shell expands radially to fit the pot die as it is compressed axially by the punch. During this process the shell must distort predictably and not crack or leak. It must not deform in a manner disruptive to the enclosed articles and after compression should have maximum unobstructed volume.

b. A key characteristic of the shell involves the way it interacts with the pot die tooling during compression. Clearance between the punch and the pot die is required to prevent damage to the press tooling during compression. The shell material must form a seal so that the fluid pressure-transmitting medium doesn't escape as the medium is pressurized by the ram. The ability to form this seal as the punch travels, without causing damage to either the punch or the pot, is a key feature of preferred shell materials. Ease of ejection from the pot die after compression without sticking or otherwise damaging the tooling is a desirable characteristic.

c. Preferably, the shell material is nonreactive with its contents and substantially nonporous to the contained media so that leakage or substantial absorption does not occur.

d. Preferably, the shell is sufficiently strong at all use temperatures so that it can be handled and will not crack or deform during processing so that it will not leak or misfit tooling.

e. Other desirable characteristics of the shell include:

1. A low coefficient of heat transfer so that press tooling is insulated from hot shell contents.

2. The ability to absorb radiant energy used for heating the assembly. Examples of radiant energy include: infrared, microwave, radio frequency, and the like.

3. The ability to either cheaply recycle or dispose of deformed shells after compression and separation from contents.

Preferred shell materials include steel, other metals, plastics, and ceramics. Most preferred for the temperature range of $\sim 300°$ F. ($\sim 150°$ C.) to $\sim 3,000°$ F. ($\sim 1,650°$ C.) when using glass media in conventional pot die tooling is a shell cast of thixotropic ceramic as taught in U.S. Pat. No. 4,428,906. This material is economically effective as a safely disposable shell material and is recyclable. The teachings of U.S. Pat. No. 4,428,906 are incorporated herein by reference insofar as they relate to the preparation, composition and recycle of thixotropic ceramic materials.

Shell/Media/Article Assembly

Figure 2:
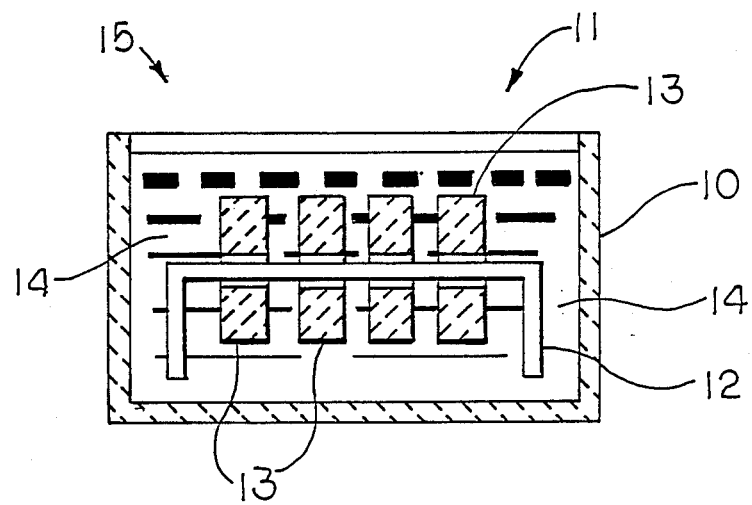
FIG. 2 is a cross-sectional view of an isostatic die assembly.

When the completed shell/media/article assembly is in the thermal, chemical and physical condition at which it will be inserted into the press tooling, it is called a hot isostatic die assembly or, by acronym, a hot IDA. Economically effective use of the process which is the subject of this invention, requires development of equipment which is suited to process a wide range of isostatic die assemblies, each of which is suited to the article(s) to be densified. The preferred IDA for the consolidation of a given article from a given particulate material requires consideration of shell and media requirements, article fixturing requirements, heating method requirements, part recovery requirements, other previously discussed requirements, and use of existing capital equipment. A typical isostatic die assembly in the "hot" condition is illustrated in FIG. 2.

Predensification Thermal, Chemical and Physical Processing

Typically, the IDA is assembled at ambient temperature and must be heated to the desired densification temperature at an optimum rate to produce a hot IDA. Heating can be by conduction, convection, or radiant means, and all combinations thereof as is best for the individual IDA's. All forms of radiant heating are contemplated including infrared, induction, radio frequency, including microwave, and the like. The components of the IDA may be at varying temperatures, and assembled in a sequence best suited to the type of thermal, chemical, and physical processing required.

Control of the chemical environment around the article during all processing steps is essential. IDA's can be assembled and processed under vacuum or under various gaseous atmospheres. The pressure-transmitting medium can contain "getters," carbon, or other compounds to control the chemical environment around the article, as taught in U.S. Pat. No. 3,992,200, the teachings of which are incorporated herein by reference. A preferred embodiment involves the use of ground glass as the medium. As the IDA is heated, the glass melts and hermetically seals the articles in the melt, protecting them from the surrounding atmosphere during subsequent processing.

The IDA may need physical processing prior to densification. Holes may be plugged, insulators added, sensors removed, etc., before the IDA is ready for the densification step.

Densification

Figure 3:
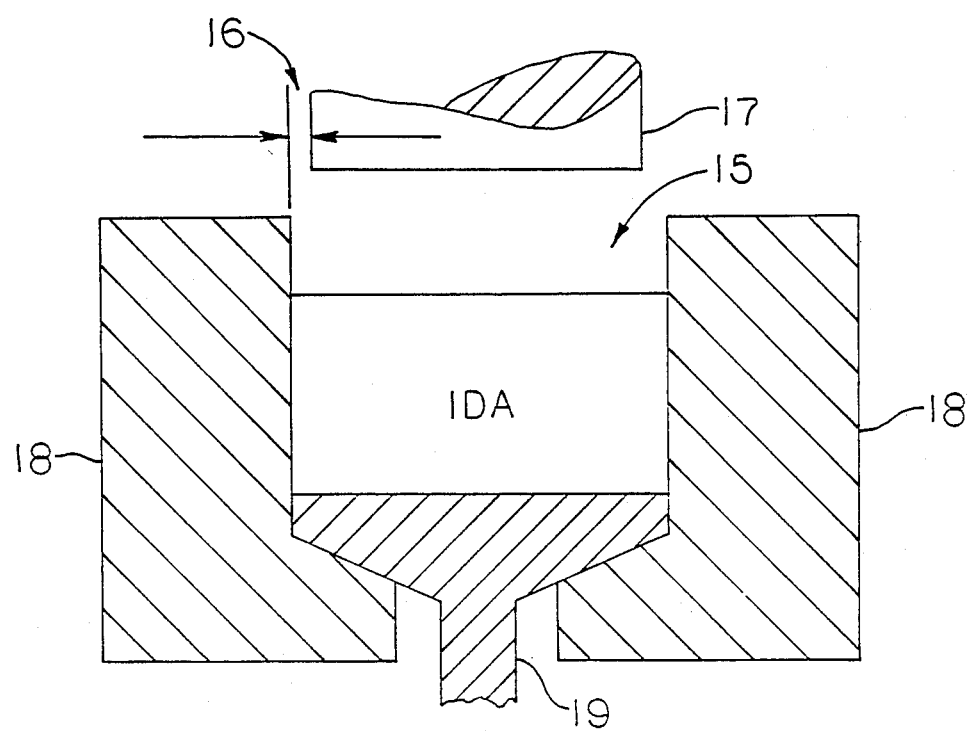
FIG. 3 is a cross-sectional view of an isostatic die assembly in a forging press equipped with pot die tooling.

Densification of the article(s) contained in the hot isostatic die assembly is effected by compressing the assembly with a ram in a closed cavity. FIG. 3 illustrates a hot IDA in a forging press. Typically, a hydraulic forging press equipped with pot die type tooling, as is shown in FIG. 3, is used for densification. As the ram compresses the IDA in the cavity, the media exerts a large hydrostatic pressure on the articles to densify them. The shell material of the IDA flows into the clearance between the ram and the pot die and effects a pressure seal so that the liquid media does not escape through this clearance during densification. Consequently, pressures as great as 500,000 psi ($3.45 \times 10^3$ MPa) can be generated in the IDA by the ram. Pressure generated by the ram must be applied and released at controlled rates. Die lubricants such as graphite, boron nitride, or metal based anti-seize compounds can be employed to prevent tooling damage. After densification, the IDA is ejected from the pot die for subsequent processing.

IDA Disassembly

Disassembly of the isostatic die assembly without damaging the enclosed, densified articles is a crucial step in any encapsulated type densification process of economic interest.

This invention involves separation of the three components of the isostatic die assembly by draining the hot liquid medium away from the articles and shell. Typically, a hot IDA is ejected from the press after densification and is inverted over a pan and screen in a furnace so that the medium drains into the pan through the screen. The dense articles are retained on the screen. This is a simple and economically advantageous means of recovering the dense articles for subsequent processing. This method also recovers the medium for reuse at a temperature which is economically advantageous. Draining can be aided, e.g., by pressure or centrifugal force. The shell of the IDA can be punctured or otherwise breeched so that it can drain without inversion if necessary. The separated article can be moved to another area to subsequently cool at a rate so that it is not affected by thermal shock. The separated shell can be discarded or reprocessed for reuse.

Final Processing

Final processing is well known to those skilled in the art. After separation of the IDA, the densified article is usually covered with a thin film of the media. This film typically is removed after cooling of the article. Typically, this film is removed by light sandblasting which does not damage the article. Thermal shock, during cooling or otherwise, can be used to craze the coating and assist removal. Chemical attack can also be used to assist removal. Following this step the densified article is ready for finish machining, surface treatment, etc., as is necessary to prepare it for sale.

Specific Embodiments

The following example is given to illustrate the invention and should not be construed as limiting its scope. All parts and percentages are by weight unless otherwise indicated. Metric units given in parentheses are approximate equivalents of English units.

EXAMPLE 1

A partially dense cylindrical rod 1 inch (2.5 cm) in diameter by 4 inches (10 cm) long is formed from commercially available partially stabilized zirconia powder (Type HSY-3 available from Daiichi Kigenso Kagaku Kogyo, Osaka, Japan through Zirconia Sales, Atlanta, Ga.) by isopressing in a rubber mold at a pressure of 60 ksi (413.7 MPa).

An open top cylindrical shell 6.3 inches (16 cm) outside diameter×5 inches (12.7 cm) inside diameter×9 inches (22.9 cm) tall with a ¾ inch (1.9 cm) thick bottom is cast as taught in U.S. Pat. No. 4,428,906. This shell is cast by mixing 2 parts of refractory cement ("50/50 Core Mix" available from Ransom and Randolph, Toledo, Ohio) with 1 part of glass (Type 7740 "Pyrex" available from the Bassichis Company, Cleveland, Ohio, crushed to −20+50 U.S. mesh) and adding water to make a slurry. This slurry is mixed for 2 minutes and poured into a rubber mold with dimensions as required to cast the shell. The shell is allowed to harden for 20 minutes and is separated from the mold. After demolding, the shell is cured overnight at 450° F. (232° C.) to prepare it for use.

The isostatic die is assembled by filling the shell to a depth of 1 inch (2.5 cm) with the glass pressure-transmitting medium (Type 7740 "Pyrex" available from the Bassichis Company, Cleveland, Ohio, crushed to −20+50 U.S. mesh), placing the partially dense rod on top of the medium, and filling the rest of the volume of the shell with the medium. The isostatic die assembly is now ready for processing.

The assembled IDA is placed in a $N_2$ purged box furnace at 2,280° F. (1,250° C.). This melts the glass and encapsulates the rod in about 30 minutes. About 1½ hours is required beyond this time to heat the IDA and the part within to a temperature of 2,250° F. (1,230° C.).

A hydraulic forging press is equipped with a pot die 10 inches (25.4 cm) long and 6.5 inches (16.51 cm) inside diameter which is equipped with a conventional ejector mechanism. A 6.45 inch (16.38 cm) diameter punch 8 inches (20.3 cm) long is attached to the press. The heated IDA is grasped with tongs and placed in the pot die. The press is activated so that the ram descends slowly and then applies maximum ram force on the open-topped IDA contained in the pot. This causes a pressure of approximately 120,000 psi (827 MPa) to occur in the IDA. This force is held for 2 seconds and then released over a 15 second period. The IDA is then ejected from the pot.

Figure 4:
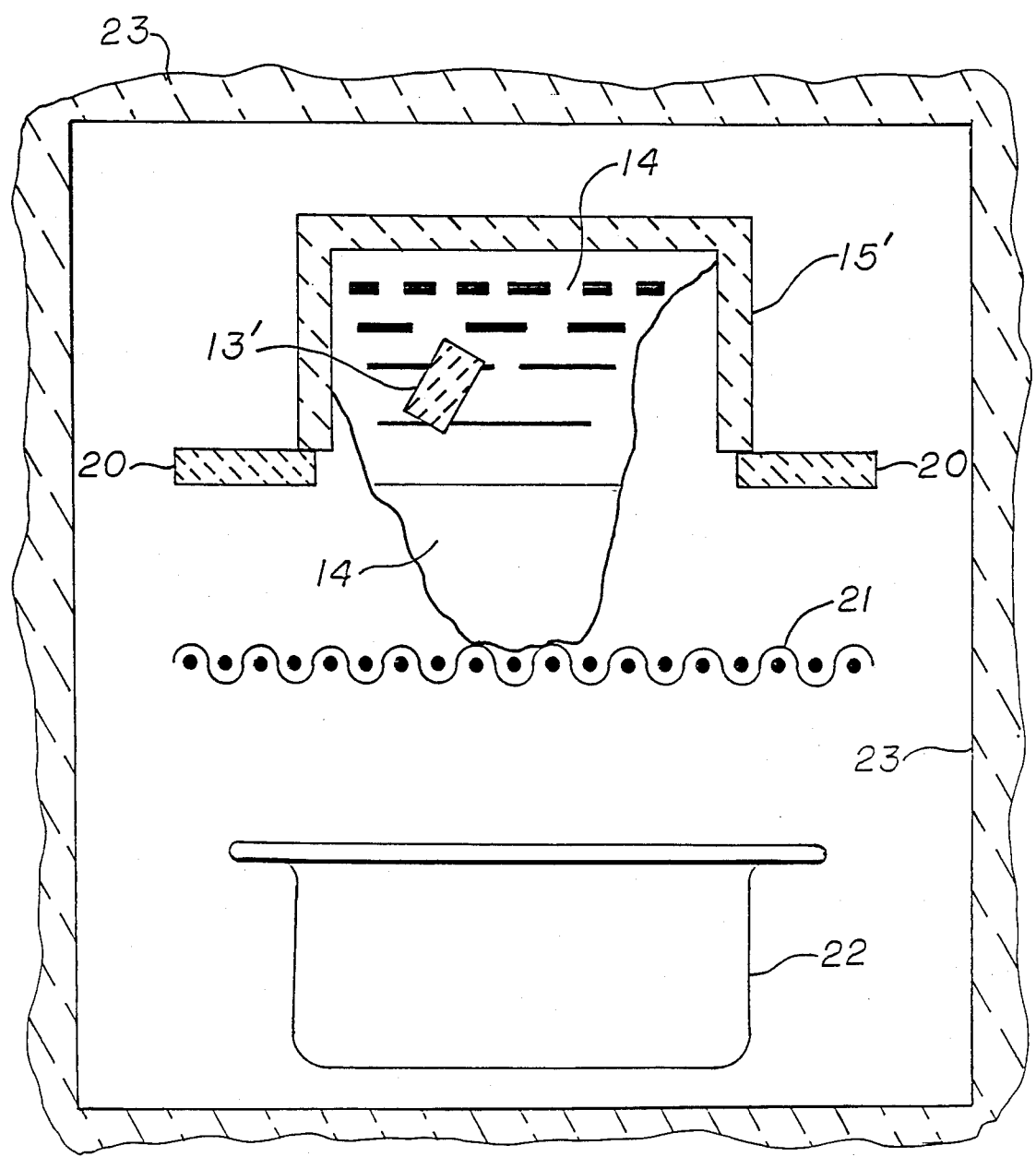
FIG. 4 is a cross-sectional view of an inverted open-topped isostatic die assembly in the separation step of the process.

The IDA is grasped with tongs and placed in a drain fixture in a box furnace at a temperature of 2,200° F. (1,205° C.). See FIG. 4. The furnace is held at 2,200° F. (1,205° C.) for 1 hour by which time the rod is resting on the screen and the glass has run into the tray. The disassembly furnace is cooled to room temperature at a rate of 200° F./hour (93.3° C./hour) to prevent thermal shock to the rod. The rod is sandblasted to remove whatever glass still adheres to it. The glass in the tray is crushed for recycle use. The used shell is discarded.

As consolidated, the recovered rods are substantially free of pores and cracks.

EXAMPLE 2

A partially dense cylindrical rod 1 inch (2.5 cm) outside diameter×4 inches (10 cm) long is formed from commercially available graded WC/6 percent Co powder (Type H-6 Graded WC/Co Powder available from Teledyne Wah Chang Huntsville, Inc., Huntsville, Ala.), containing 2.25 percent wax, by isostatic pressing in a rubber mold at a pressure of 30,000 psi (207 MPa). This rod is thermally dewaxed and otherwise prepared for densification.

An open top cylindrical shell is cast of a thixotropic glass/refractory material as in Example 1. The material is formulated to be substantially plastic at a use temperature of 2,250° F. (1,232° C.).

A pressure-transmitting medium composed of Pyrex ® Glass Brand No. 7740 glass, available from Corning Glass Works, is prepared by crushing to −20+50 U.S. mesh, washing, and drying.

The shell is filled to a depth of 1 inch (2.5 cm) with the crushed media. The rod is placed on the media in the shell. Fixtures may be used to orient the rod. The shell is filled to the top with the crushed media. The top of the shell remains open. The IDA is processed using the method of Example 1. The recovered rods are substantially free of pores and cracks.

EXAMPLE 3

The procedure of Example 1 is repeated except that the glass pressure-transmitting medium is glass which was crushed in Example 1 for recycle. The recovered rods are substantially free of pores and cracks.

EXAMPLE 4

The procedure of Example 1 is repeated except that the recovered pressure-transmitting medium is not allowed to solidify. The procedure of Example 1 then is repeated again except that the pressure-transmitting medium is recycled while molten from the first procedure of this Example. The recovered rods are substantially free of pores and cracks.

What is claimed is:

1. A process for preparing dense, consolidated bodies of predetermined density, the process comprising compressing in a forging press an isostatic die assembly, the assembly comprising a preform surrounded by a fluid pressure-transmitting medium, the medium and the preform being contained in a ceramic-containing shell having an open top; under sufficient conditions of temperature, time and pressure that a dense, consolidated body of desired shape is formed, and then recovering the body by separating the body from the fluid pressure-transmitting medium.

2. The process of claim 1 wherein the fluid medium comprises a glass, metal, salt, oil, grease or mixture thereof.

3. The process of claim 2 wherein at least a portion of the medium is recycled.

4. The process of claim 3 wherein at least a portion of the medium is recycled as a liquid.

5. The process of claim 3 wherein the fluid medium is collected and passes through a brittle phase during recycle.

6. The process of claim 2 wherein the medium is glass having a melting point of from about 500° C. to about 2,500° C.

7. The process of claim 2 wherein the bodies consist essentially of metal, plastic or ceramic materials, or mixtures thereof.

8. The process of claim 7 wherein the bodies are metal.

9. The process of claim 7 wherein the bodies are ceramic.

10. The process of claim 2 wherein the bodies comprise at least one of zirconia, silicon carbide, silicon nitride and alumina.

11. The process of claim 1 wherein the shell is a composite shell comprising: (A) a rigid interconnected skeleton structure which is collapsible in response to a predetermined force, and (B) a fluidizing means capable of fluidity and supported by and retained within said skeleton structure for forming a composite of skeleton structure fragments dispersed in said fluidizing means in response to the collapse of said skeleton structure at said predetermined force and for rendering said composite substantially fully dense and incompressible and capable of fluid flow at the consolidation conditions.

12. The process of claim 1 wherein the shell is a composite shell comprising: (A) a rigid interconnected skeleton structure which is collapsible in response to a predetermined force, and (B) a glass which is capable of plastic flow under consolidation conditions.

13. The process of claim 12 wherein the glass of the composite shell comprises borosilicate glass.

14. The process of claim 11 wherein the fluidizing means comprises a metal or a polymer or both.

15. A method for the consolidation of powered materials, the method comprising:
(a) placing a preform in a pressure-transmitting medium, the medium being contained in an open-topped ceramic-containing shell, to form a die assembly;
(b) heating the die assembly to a temperature at which the pressure-transmitting medium is capable of fluidic flow;
(c) in a forging press, compressing the die assembly to consolidate the preform under omnidirectional pressure into a dense, consolidated body of desired shape; and
(d) separating the fluid pressure-transmitting medium from the consolidated body.

16. The method of claim 15 wherein step (d) comprises inverting the die assembly over a filter in a manner such that the consolidated body is recovered on the filter and the fluid medium passes through the filter.

17. The method of claim 16 wherein the fluid medium is recovered and recycled.

18. The method of claim 17 wherein the fluid medium is recycled as a fluid.

19. The method of claim 18 wherein the fluid medium comprises glass.

20. In a process for the consolidation of metallic and nonmetallic powders and combinations thereof to form a brittle consolidated body of predetermined density, the process comprising subjecting a die assembly to pressure in a forging press, the die assembly comprising a shell and a fluid pressure-transmitting medium, the improvement comprising using an open-topped ceramic-containing shell and recovering the brittle consolidated body from the fluid pressure-transmitting medium.

* * * * *